May 13, 1930.    E. B. GOODWIN    1,758,910
ROTATING FILTER
Filed July 24, 1928    2 Sheets-Sheet 1

Inventor:
Edwin B. Goodwin.
By Homer L. Sweet.
Attorney.

May 13, 1930.  E. B. GOODWIN  1,758,910
ROTATING FILTER
Filed July 24, 1928    2 Sheets-Sheet 2
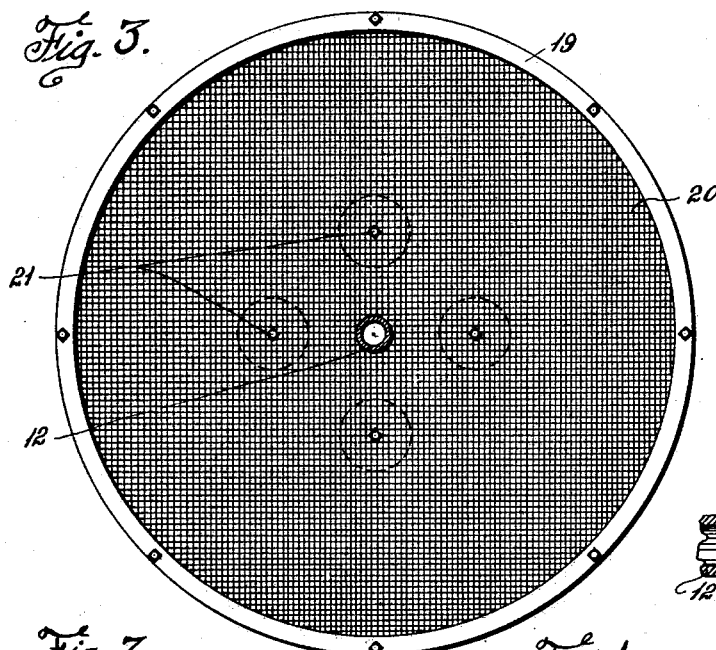
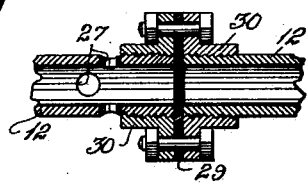
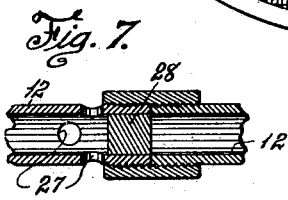
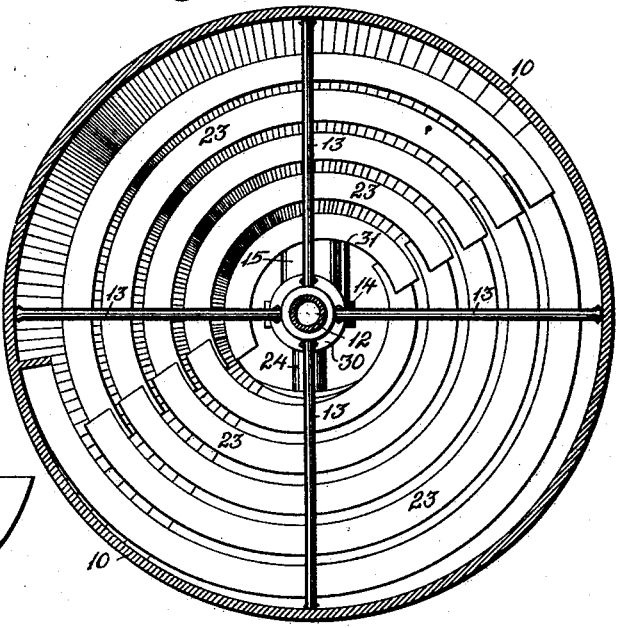
Inventor:
Edwin B. Goodwin.
By Homer P. Sweet
Attorney.

Patented May 13, 1930

1,758,910

UNITED STATES PATENT OFFICE

EDWIN B. GOODWIN, OF DENVER, COLORADO

ROTATING FILTER

Application filed July 24, 1928. Serial No. 295,030.

This invention relates to filters and dewatering devices of a type adapted for continuous operation, wherein the mixture to be filtered may be continuously introduced into the filter in proper quantities and wherefrom the filtered solution and residual sediment may be discharged continuously; the filter forming the subject matter of this invention being specifically adapted for use in combination with ore reduction processes for the recovery of metallic values.

The principal object of the invention is to provide a filter adapted for continuous operation which will efficiently filter and dewater a mixture of pulverized material and liquid.

Other objects and uses of the improved filter will be obvious to those skilled in the art and will more fully appear from the following specification and claims.

My invention consists in the construction, arrangement and combination of elements hereinafter set forth, pointed out in my claims and illustrated by the accompanying drawings, in which—

Figure 1:
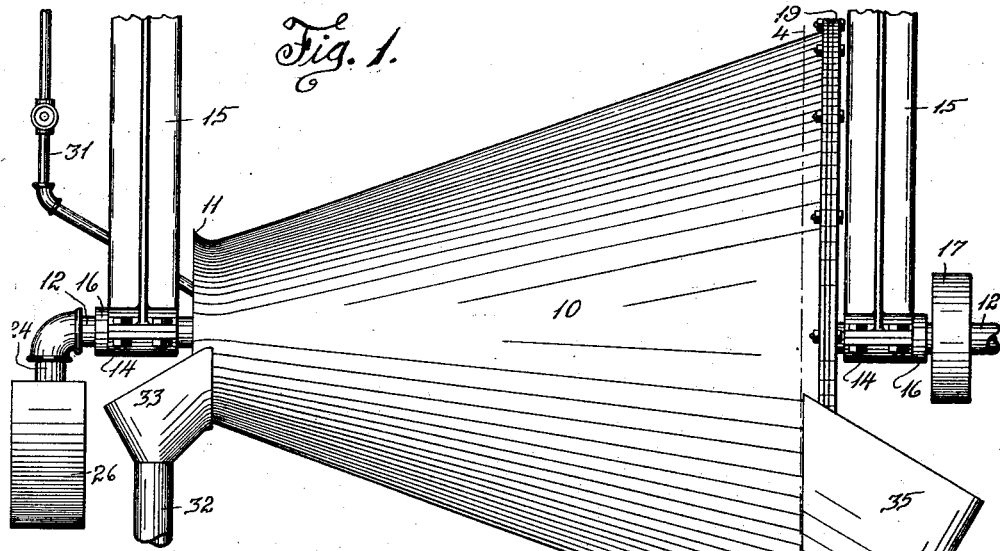
Figure 2:
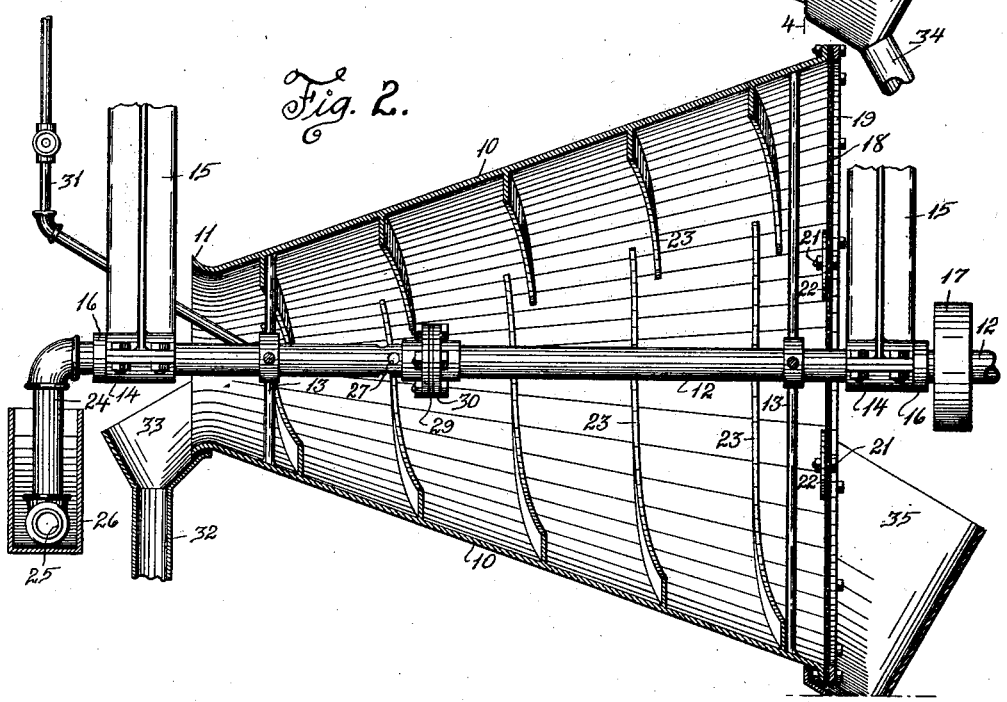

Figure 1 is a side elevation of a preferred form of the improved filter mounted for practical use. Figure 2 is a vertical, longitudinal section of the showing of Figure 1. Figure 3 is an end elevation of the improved filter, partly in section, certain parts not essential to the filter being omitted. Figure 4 is a vertical, transverse section through the filter on the indicated line 4—4 of Figure 1. Figure 5 is an end elevation opposite to Figure 3, partly in section, certain parts being omitted or broken away to conserve space. Figure 6 is a fragmentary sectional view, on an enlarged scale, of a portion of the means employed in introducing the mixture to be filtered into the filter. Figure 7 is a view similar to Figure 6 showing an alternative construction of the elements shown in said latter figure.

In the construction of the improvement, as shown, the numeral 10 designates a hollow shell having the form of an open-ended, truncated cone, said shell being formed in any suitable manner and of any desired material, metal being preferred and preferably having its smaller open end belled as indicated at 11. The shell 10 is secured to an axial, hollow shaft 12 by means of suitable spiders 13, or other bracing of a like nature, the shaft 12 extending axially through and projecting at each end beyond said shell, the assembly of shell and shaft thus formed being mounted for rotation with said shaft in a horizontal position between journals 14 in which the projecting portions of said shaft are received, said journals 14 being suitably positioned and supported by means of hangers 15 or other desired means, said shaft being secured against axial displacement between said hangers by any suitable arrangement, collars 16 secured to said shaft and bearing against the journals 14 being shown for that purpose. A belt pulley 17 is secured to the shaft 12 at any suitable point outside of the shell 10, said pulley affording means of connection between said shaft and a source of power whereby the said shaft and shell assembly may be caused to rotate, preferably at low speed. The larger, open end of the shell 10 is closed by a sheet of filtering material 18, preferably fabric or fibrous material of fine mesh, said sheet 18 being stretched taut and secured to said shell by means of a clamping ring 19 bolted or otherwise removably and replaceably attached to said shell, coarse wire or metallic mesh 20 being likewise secured across the end of said shell without the fabric 18 and between said fabric and the ring 19 to serve as a support for said fabric, to which mesh 20 said fabric is secured at suitable intervals by means of bolts 21 and washers 22. Radially-extending ribs 23 are formed on or rigidly secured to the inner surface of the shell 10 in the form of an interrupted helix having a pitch ascending toward the lesser end of said shell, said helix being broken at least twice in each convolution and having its broken ends overlapped in such manner that the end of advancing end of any given segment is overlapped on, spaced from and in advance of the trailing end of the next advancing segment, thus leaving passages through said helix through which liquid may run under the influence of gravity toward the lower, larger end of said shell and the filtering surface supported thereon. The end of the hollow shaft 12 extending beyond the lesser end of the shell 10 is bent at right angles with the axis of said shaft to form a radial arm 24, the outer end of said arm being fitted with an open extension or nipple 25 opening in the direction of rotation of said arm and shaft 12, and a tank 26, of any suitable size and construction, adapted to receive and contain the mixture to be filtered, is so mounted as to permit the arm 24 and its nipple 25 to dip within said tank 26 as the shaft 12 and shell 10 rotate and lift some of the contents of said tank into the bore of the said shaft 12, which shaft is apertured some distance within the shell 10, as indicated at 27, to permit discharge of the mixture from said shaft into said shell, said shaft being blocked beyond said apertures by means of a plug 28, as indicated in Figure 7, or by means of a transverse diaphragm 29 secured between halves of a flanged coupling 30, as shown in Figure 6, or otherwise, to insure discharge of the contents of said shaft 12 through said apertures. A valve-controlled water line 31 leads from a suitable water supply to discharge within the shell 10 slightly within the lesser end thereof, for the purpose of supplying water to the contents of said shell and more thoroughly wash the same. A conduit 32, having a funnel-shaped upper end 33, is suitably mounted in position to receive the discharge from the lesser, belled end of the shell 10, and a similar conduit 34, having a funnel-shaped upper end 35 is mounted in receiving relation with the larger end of said shell, said conduits leading to the points desired for the further treating of the separated portions of the mixture filtered.

In the operation of the filter as shown and described, the ore to be refined having been ground to the requisite degree of fineness and thoroughly mixed with and agitated in a solution of chemicals to dissolve out the metallic values, the mixture of ore pulp and solution is brought to the tank 26 ready for filtering. The filter, mounted as shown in Figures 1 and 2, is caused to rotate slowly through the medium of a source of power in driving relation with the pulley 17, whereupon the radial arm 24 and attached nipple 25 is caused to rotate and dip into the tank 26 during a portion of its revolution, picking up some of the mixture in said tank and carrying the mixture to the bore of the shaft 12 from whence it is discharged through the apertures 27 into the interior of the shell 10 intermediate its ends. The mixture is thus constantly fed to the interior of the shell 10, wherein it is thoroughly agitated by means of the helical segments 23, which, because of their pitch, tend to force the ore pulp toward the smaller end of said shell for discharge through the belled end 11 into the conduit 32, the liquid portion of the mixture flowing under the influence of gravity over the segments 23 and through the gaps therebetween to the lower, larger end of the shell 10 and against the filtering material 18, through which it seeps, completely filtered, into the funnel 35 and conduit 34 to be led to precipitation tanks and processes which recover the values held in solution by said liquid and whence the chemicals may be returned to be used again in a repetition of the process. Water is sprayed on the ore pulp as it approaches its point of discharge, through the valve-controlled pipe 31, to more thoroughly cleanse the said pulp of all chemical solution and values, thereby permitting discharge of clean tailings and complete recovery of the ore values.

Since many changes of form and construction may be had without departing from the spirit of my invention, and the same may be applied to uses other than above set forth, I wish to be understood as being limited solely by the scope of the appended claims rather than the foregoing description and illustrative showing.

I claim as my invention—

1. A rotating filter comprising a hollow, open-ended shell having the form of a truncated cone, a shaft axially of and projecting at either end beyond said shell, rigid connections between said shaft and shell, means for rotatably supporting said shaft in horizontal position and means on said shaft whereby said shaft and shell may be rotated, filtering material transversely of, closing and removably and replaceably secured to the larger end of said shell, an interrupted helix on the inner surface of and projecting radially within said shell, the pitch of said helix ascending toward the lesser end of said shell, and means for introducing a mixture to be filtered into said shell.

2. A rotating filter comprising a hollow shell in fixed axial relation with a horizontally-disposed, rotatable shaft, means for rotatably supporting and for rotating said shaft and shell, filtering means transversely of and closing one end of said shell, agitating and separating means within, fixed to and rotatable with said shell, said means comprising an interrupted helix on the inner surface of and projecting radially within said shell, the pitch of said helix ascending toward the lesser, open end of said shell and the ends of the segments of said helix being overlapped in ascending relation, together with means for introducing a mixture to be filtered into said shell and conducting means in receiving relation with each end of said shell.

Signed at Denver, in the county of Denver and State of Colorado, this seventeenth day of July, 1928.

EDWIN B. GOODWIN.